Oct. 4, 1955      O. T. EDWARDS      2,719,760

PIVOT SHAFT BUSHING KIT ADAPTOR

Filed May 20, 1952

Otis T. Edwards
INVENTOR.

United States Patent Office 2,719,760
Patented Oct. 4, 1955

2,719,760

PIVOT SHAFT BUSHING KIT ADAPTOR

Otis T. Edwards, Blairsville, Pa.

Application May 20, 1952, Serial No. 288,847

1 Claim. (Cl. 308—2)

This invention relates to a pivot shaft bushing kit adaptor and particularly to a bushing kit for replacing the original bushings in the pivot shaft suspension of the forward end of an automobile.

In the operation of the automobile having a pivot shaft suspension the bushing about the pivot shaft becomes worn and oval in formation so that there is a tendency for the front wheels or the front suspension of the tire to wobble. Heretofore, it has been necessary to replace the dome of the front suspension preferably also the pivot shaft so that repair of such parts have been extremely expensive.

The present invention relates to a pivot shaft bushing kit adaptor in which a pivot shaft is provided with new bushings by cutting out a portion of the dome and applying the bushing kit adaptor around the pivot shaft.

The adaptor according to the invention provides a bushing body for mounting on the pivot shaft and a tapered seat for mounting in a new hole in the dome together with an external head on the bushing body and a lock washer and lock nut on the inner end of the body to put the replacement bushing in place.

It is an object of this invention to provide a pivot shaft bushing kit adaptor.

It is a further object of this invention to provide a replacement bushing.

It is a further object of this invention to provide a kit for repairing the suspension of an automobile.

It is a further object of the invention to provide an improved bushing kit.

Figure 1:
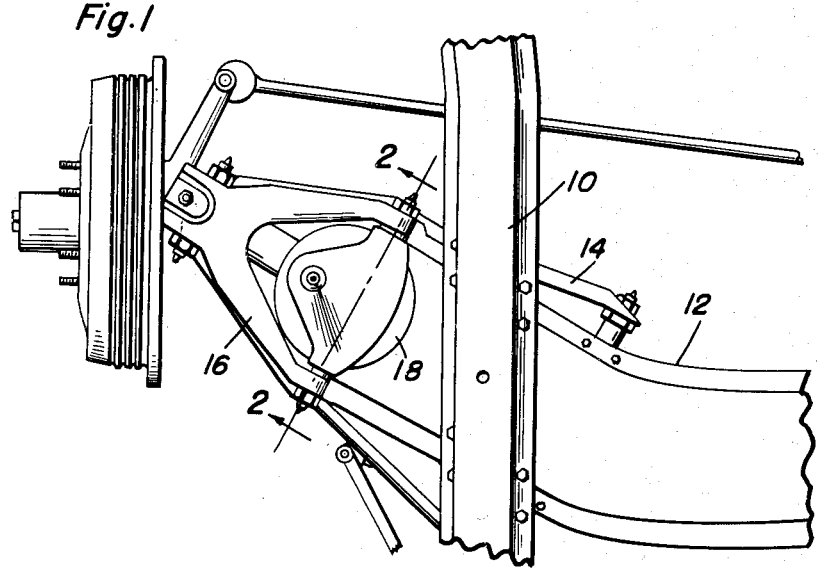
Figure 2:
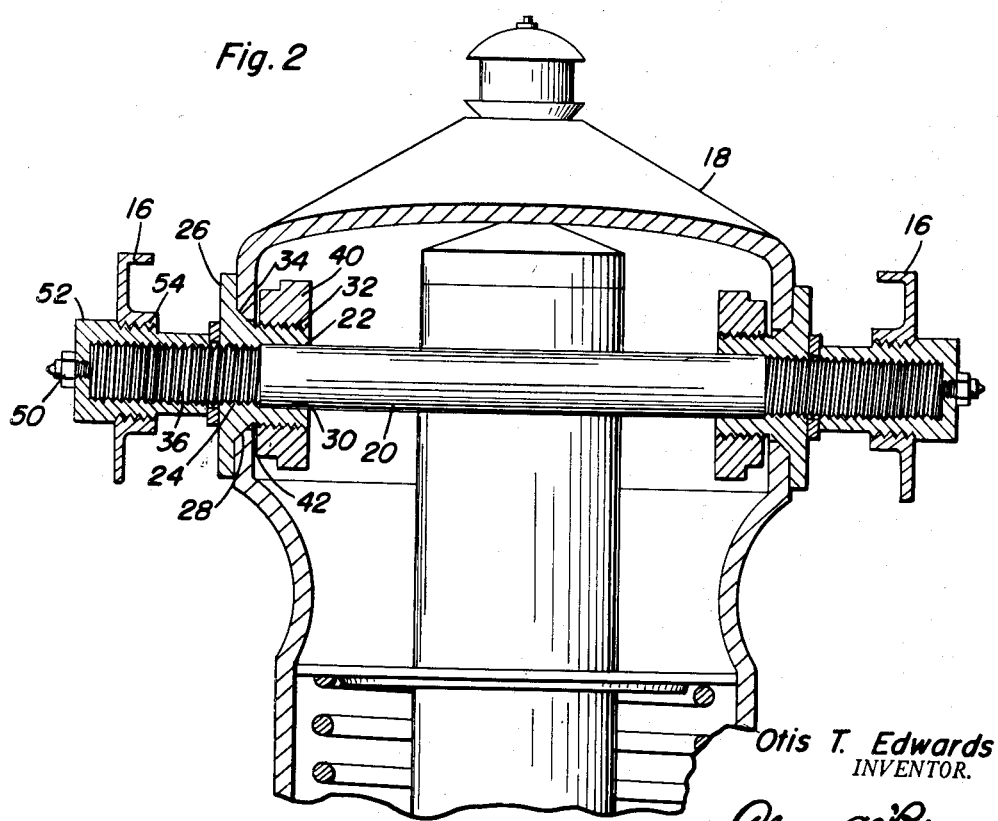

Other objects and many of the attendant advantages of this invention will be apparent from the following detailed description taken in conjunction with the accompanying drawing in which:

Figure 1 is a plan view of the front suspension showing the shock absorber dome in place with the pivot shaft mounted in the upper control arm; and Figure 2 is an enlarged sectional elevation through the shock absorber dome showing the pivot shaft bushing kit adaptor in position.

In the exemplary embodiment of the invention an automobile frame 10 has connected thereto a front axle support 12 to which is pivotally connected the lower control arms 14 and the upper control arms 16. The shock absorber dome 18 is connected to the upper control arm 16 by means of a pivot shaft 20.

As originally installed the dome 18 is provided with oppositely disposed bushings which are reenforced by means of bearing washers spot welded to the metal of the dome. When these original bushings become worn they are replaced with the kit of the present invention which comprises a bushing body 22 having internal threads 24 and an external mounting head 26 which is substantially flat. A tapered seat 28 is provided between the head 26 and the bushing body 22. The body 22 is counter-bored as at 30 to provide a substantially cylindrical portion 30 snugly fitting the exterior of the pivot shaft 20. The body 22 is provided with external threads 32 extending from the end remote from the head 26 to the base of the tapered seat 28. A bushing repair kit is installed by cutting out the original bushing and providing a tapered seat 34 to fit the tapered seat 28 and the bushing 22 is adjusted on the shaft 20 by engaging with the external threads 36, the body 22 is then locked in position by means of a nut 40 engaging the threads 32 and preferably held in position by means of a lock washer 42.

Usually both ends of the shaft 20 will be rebushed at the same time so the kit will consist of a pair of replacement bushings although it will be obvious that if desired only one of the bushings may be replaced.

In the utilization of the repair kit the device is disassembled by removing the screws 50 from the ends of the bearing studs 52 which are threadedly engaged in the upper control arm 16. The bearing studs 52 may then be readily removed from the end of the shaft 20 and the threaded aperture 54 in the control arm 16. The shafts 20 will then be readily removed from the dome 18 and the bushing apertures drilled out to the proper size and provided with a tapered seat 34, the bushing bodies 22 are then assembled on the shafts 20 and placed in substantially correct alignment. The lock nuts 40 are then placed in position so that the replacement bushing 22 is firmly anchored on the side of the dome 18 after which the stud bearings 52 may be replaced in position and locked by means of the lock screws.

It will be apparent that either one or both of the bushings may be replaced as is necessary and that the stub shafts 52 may be adjusted as is desired to maintain the proper relation of the dome 18 to the control arm 16 and the entire construction maintained in clamped fixed position by means of the set screw 50.

A preferred embodiment of the invention has been shown and described according to the best present understanding thereof. It will be obvious that many changes and modifications can be made therein without departing from the true spirit of the invention.

Having described the invention, what is claimed as new is:

A pivot shaft repair unit comprising a hollow cylindrical shank, a flat head on one end of said shank, a threaded bore in said shank for threadingly receiving a pivot shaft, said shank having a counterbore portion at the end remote from the head, a tapered external seat integrally joining said head with said shank, said shank being externally threaded, and a nut threadingly engaging the external threads of said shank.

References Cited in the file of this patent

UNITED STATES PATENTS

| | | |
|---|---|---|
| 1,463,423 | Hem | July 31, 1923 |
| 2,002,781 | Leighton | May 28, 1935 |
| 2,039,912 | Leighton | May 5, 1936 |
| 2,537,552 | Schlegel | Jan. 9, 1951 |
| 2,635,927 | Leighton | Apr. 21, 1953 |